Figure 1:
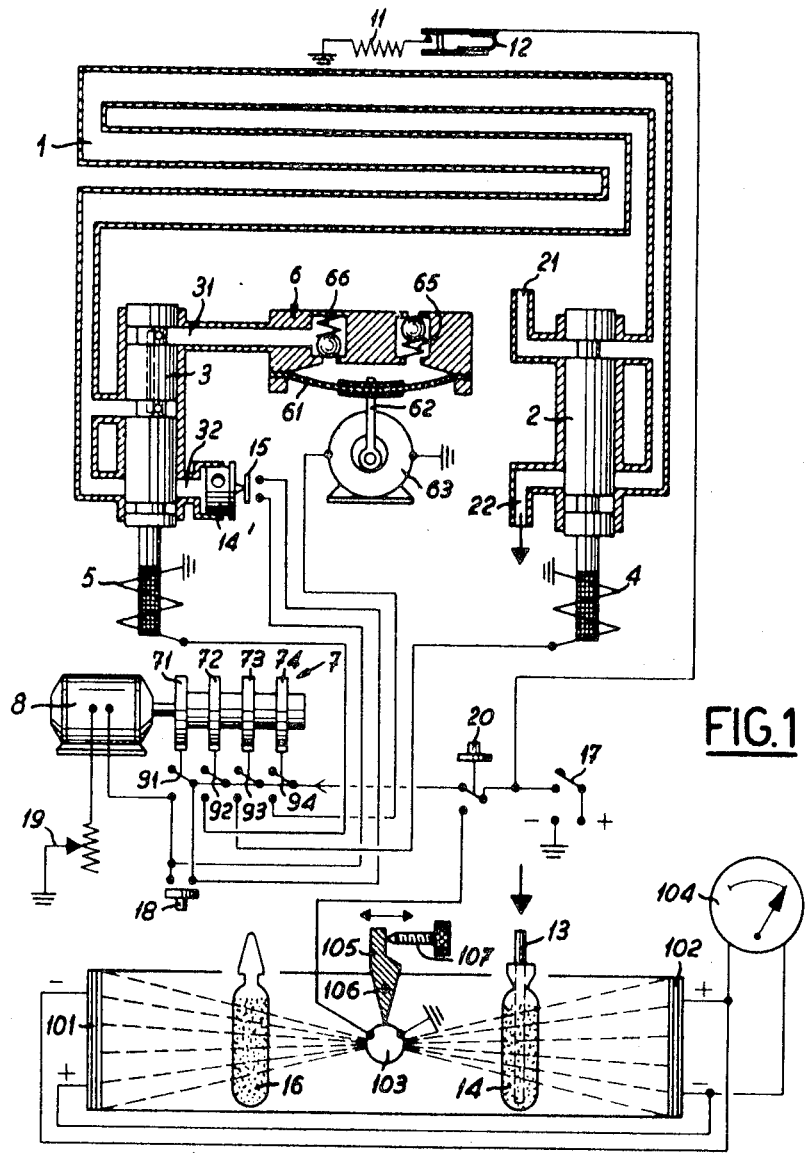

United States Patent

[11] 3,607,095

| [72] | Inventor | Lucien Etzlinger<br>12 rue de Hesse, 1204 Geneva, Switzerland |
|---|---|---|
| [21] | Appl. No. | 765,456 |
| [22] | Filed | Oct. 7, 1968 |
| [45] | Patented | Sept. 21, 1971 |
| [32] | Priority | Oct. 9, 1967 |
| [33] | | Switzerland |
| [31] | | 14062/67 |

[54] APPARATUS FOR DOSING A LIQUID OR GASEOUS FLUID BY COMPARISON
6 Claims, 2 Drawing Figs.

[52] U.S. Cl. .................................................. 23/254 R,
23/230 R, 23/255 R, 73/421.5 R, 137/624.18, 250/218
[51] Int. Cl. ........................................................ F17d 3/00,
G01n 1/22, G01n 21/24
[50] Field of Search ........................................... 23/254,
253, 230, 255 E, 254 E, 255; 250/218; 141/89, 90, 91; 73/421.5; 137/624.18

[56] References Cited
UNITED STATES PATENTS

| 1,799,113 | 3/1931 | Miedbrodt | 137/624.18 X |
| 2,549,974 | 4/1951 | Klug | 23/255 E |
| 3,193,358 | 7/1965 | Baruch | 23/253 |
| 3,476,516 | 11/1969 | Curry | 23/254 |

Primary Examiner—Morris O. Wolk
Assistant Examiner—R. M. Reese
Attorney—Young & Thompson ABSTRACT: Apparatus for measuring a liquid or gaseous fluid by comparison, comprising a duct, means for effecting the automatic rinsing out of the duct by means of a neutral fluid, the filling of the duct with the fluid to be analyzed, and the automatic emptying of the duct into an analyzing receiver, means for checking the filling comprising a valve device automatically put into service during the filling and ensuring that the cycle proceeds or is stopped according to whether the filling is effected or not, and automatically put out of service after a predetermined time interval chosen in such a way that the duct contains none but the fluid to be analyzed, and a device for measuring the fluid contained in the said receiver by comparison.

INVENTOR
LUCIEN ETZLINGER
BY Young & Thompson
ATTYS

APPARATUS FOR DOSING A LIQUID OR GASEOUS FLUID BY COMPARISON

The present invention concerns an apparatus for measuring a liquid or gaseous fluid by comparison. It is designed in such a manner as to offer maximum security and to preclude any error in manipulation in order that it may be left in the hands of untrained persons. Thus, owing to automatization it is not possible to modify the sequence of the operations, or to forget one of them. On the other hand the apparatus is conceived so that the times of the various operations may be modified at will according to the measuring operation to be effected.

The apparatus according to the invention is characterized in that it comprises a duct, means for effecting a cycle of operation comprising the automatic rinsing out of the duct by means of a neutral fluid, the filling of the duct with the fluid to be analyzed, and the automatic emptying of the duct through an analyzing receiver, means for checking the filling comprising a valve device automatically put into service during the filling and ensuring that the cycle proceeds or is stopped according to whether the filling is effected or not, and automatically put out of service after a predetermined time interval chosen in such a way that the duct contains none but the fluid to be analyzed, and a device for measuring the fluid contained in the said receiver by comparison.

The apparatus according to the invention thus finds a particularly interesting application for measuring alcohol in the breath for checking drunkenness at the wheel, or for measuring carbon monoxide in the air, for instance.

In the case of the analysis of alcohol in the breath, a colored reaction may be used and the final determination made by means of a photometer incorporated with the apparatus. In this case use may be made for instance, of a glass ampulla, into which a predetermined volume of predetermined concentration of the reagent (bichromate or chromic acid for instance) is introduced. A differential determination is effected by means of a second ampulla containing the same reagent.

The accompanying drawing illustrates, by way of example, an embodiment of an apparatus destined for this kind of analysis.

The FIG. 1 is a diagram of the apparatus.

Figure 2:
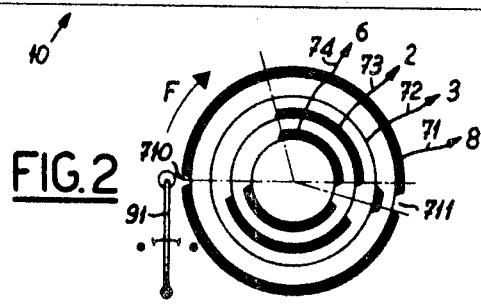

FIG. 2 shows a diagram of the cams of the programming device of the apparatus.

The beginning of the cycle comprises a total flushing out of the whole of the apparatus, the time interval during which the operation is effected having previously been set. It is calculated in such a fashion that whatever state the apparatus may be in before flushing there is no trace of the substance to be measured remaining at the end of this operation.

1. The analysis is effected according to an initially programmed cycle so it is impossible to effect the sampling of the fluid to be measured before the end of the flushing out, which is not the case for the devices previously used.

2. The duration of the sampling, of a sample contained in the air, for instance, is calculated in such a manner that the reservoir and the ducts no longer contain anything beside the mixture to be analyzed, all traces of air or of another flushing gas having been eliminated. 3. A system of green and red signal lights enables the person effecting the measuring operation lights check at any moment whether the operation is proceeding normally and in the case of measuring alcohol in the breath for instance, whether the sampling of the breath is being effected correctly. The duration of this sampling is calculated in such a manner that at the end of this operation the reservoir contains only alveolar air.

4. The passage of the sample from the reservoir into the reagent is ensured by an automatically controlled membrane pump. The duration is calculated so that all of the fluid passes into the reagent at a speed such that the substance to be measured is quantitatively retained in the reagent. Duration and speed are preset at will on the programming device, according to the substance to be measured.

The cycle is conceived in such a manner that it is impossible to effect the final measurement (determination of the optical density by means of a photometer, for instance) before the termination of the dosing reaction. The apparatus (Figure 1) is essentially constituted by a coiled duct 1 (constituting the reservoir into which the sample to be analyzed is introduced) the ends of which end at two two-way slide valves 2 and 3, electromagnetically actuated by a solenoid 4 or 5, by a membrane pump 6, by a cam programming device 7 driven by a reduction gear motor 8, the cams 71, 72, 73 and 74 respectively acting on contact switches 91, 92, 93 and 94, and by a photometer 10 comprising two photoelectric cells (for instance selenium cells) 101 and 102 connected in a bridge, between which is arranged a source of light 103 (an iodine lamp for instance), and a microammeter 104 for taking the readings, which is connected in parallel with the two cells. The motor 8 is an electric motor, but it could be constituted by any similar device, for instance a motor running on pulses furnished by an electronic circuit.

The coil 1 is milled in a metallic block providing a calorifically steady mass and comprising in addition an electric heating element 11 fed through a thermostatic switch 2 which maintains the temperature of the coil between 35° and 40° C.

The two-way slide valve 2 comprises an opening 21 serving for the escape of the air when flushing by means of the membrane pump 6 is being effected on the one hand, and on the other for the introduction of the breath to be analyzed, and a second opening 22 connected by a pipe which is not shown to a bubble tube 13 plunging into the reagent liquid of an ampulla 14.

The two-way valve 3 is connected by a duct 31 to the membrane pump 6, whilst its other opening 32 is provided with a valve 14' the axial displacement of which causes the actuation of an contact element 15.

The membrane pump 6 compresses a membrane 61 set in motion by a connecting rod 62 driven by an electric motor 63. The pump comprises in addition a ball inlet valve 65 and a ball outlet valve 66. The coiled duct and the valves are preferably machined in the same block.

The cams of the programming device are shown diagrammatically in FIG 2. These cams rotate in the direction of the arrow F. The contact switches 91, 92, 93 and 94 close the corresponding circuits shown in FIG. 1 when they are lifted by the segments of each of the respective cams.

The photometer is of known conception. An iodine lamp has been chosen as light source because it is more powerful, which enables the sensitivity of the apparatus to be increased. Before the measurement, the ampullas 14 and 16 are placed in the apparatus, before any reaction whatsoever has taken place in the ampulla 14, and the ammeter is set to zero by adjusting the position of the lamp 103 by means of the screw 107. When the eventual reaction between the product to be measured and the reagent has taken place in the ampulla 14, the measurement is effected. The cell 102 will be illuminated in the same way as the cell 101 when no reaction has taken place, and the ammeter 104 will remain at the zero reading. On the other hand, if a reaction has taken place in the ampulla 14, the latter will become less opaque or more opaque, according to the chose reagent, so that the illumination of the cell 102 will be different from that of the cell 101. This unbalance will cause the ammeter 104 to be deflected as a function of this difference. The ammeter may be directly graduated in percents of the product to be measured present in the ampulla 14.

Operation of the apparatus in the case of the measurement of alcohol in the breath (or of one of the constituents of a gaseous mixture (or vapor):

The apparatus being at rest, the cams being in the position shown in FIG. 2, it is switched on by means of a main switch 17 which at the same time turns on a red signal light. The contact switch 91 being however in a notch 710 of the cam 71, the motor 8 is not in circuit. Starting the motor is effected by pressing the bottom 18 which short circuits the contact switch 91 and initiates the cycle. At this moment a green signal lights up. The speed with which the cycle proceeds is adjusted by means of the potentiometer 19 which is in series with the motor. The valves are in the position shown in the drawing.

As soon as the motor begins to run, the first segment of the cam 74 closes the contact switch 94 which starts the motor 63 of the membrane pump running, this pump effecting the flushing out of the coiled duct and of all the ducts by blowing air through them.

The cam 74 then releases its contact switch and thus stops the flushing operation, whilst the cam 72 actuates its contact switch, and immediately afterwards, the cam 71 releases its contact switch, so that the motor 8 stops and current flows through the solenoid 5 of the valve 3 thus putting the opening 32 of the latter in communication with the coiled duct, whilst the contact switch 91 stops the cycle and turns out the green warning light. The phase during which the sample of breath or of any other gaseous mixture is obtained and introduced through the opening 21 by means of a flexible tube is now begun. When the subject to be analyzed blows into the opening 21, his breath, which given the small diameter of the coiled duct forms a front without mixing with the air contained in the former, expels this air through the valve 14', which closed the circuit of the motor 8 by means of the contact switch 15. Thus, whenever the subject stops blowing into the coiled duct, pressure no longer acts on the valve 14, the circuit of the motor is interrupted and the green lamp does not light up. In order that the space 711 of the cam 71 may be run through by the contact switch 91, it is thus necessary for the subject to blow into the coiled duct during an interval of time corresponding to the time taken by the cam carrying shaft to effect a rotation the angle of which is equal to the arc 711. The time taken to expel the whole of the sample (alveolar air) from the reservoir may be determined experimentally by means of a simulator.

The controlled induction of the sample having come to an end, the phase during which the sample passes into the ampulla 14 begins. This phase is controlled by the cam 73 the contact switch 93 of which closed the circuit of the solenoid 4 of the valve 2 and thus puts the coiled duct in communication with the opening 22. Simultaneously the pump 6 is again put in circuit and the gas to be analyzed is blown into the ampulla containing the reagent. The duration of this operation is amply calculated in order to ensure that the total quantity of gas to be analyzed contained in the coiled duct is forced into the ampulla 14. The motor 8 then stops automatically when the contact switch 91 falls back into the notch 710.

The reading of the ammeter are proportional to the concentration of alcohol in the breath.

As has already been mentioned, the principal advantages of this apparatus are, on the one had its automatic operation, conceived in such a manner that none of the operations necessary for the analysis can be reversed, forgotten or interrupted without the apparatus being stopped. On the other hand, the time taken by each operation, once determined and set in the programming device is rigorously constant, In addition the apparatus has considerable flexibility. It is in fact possible to adjust at will the time taken by the various steps, according to the measurement to be effected. Moreover, a system of signal lights enables the various steps of the analysis to be followed. The apparatus is however not limited to the determination of alcohol in the breath, as it may be utilized for the analysis of any fluid, liquid or gaseous, and in particular for the determination of the amount of impurities in the air ($CO$, $SO_2$, $H_2S$...) in the breath, or in industrial gases.

What is claimed is:

1. In an apparatus for the determination of the concentration of a fluid, comprising fluid storage means, means for automatically flushing the storage means with a neutral fluid, means for filling the storage means with a fluid to be determined and means for emptying the storage means into an analyzing receiver for comparison with a reference fluid; the improvement in which the fluid storage means is an elongated duct, means preventing flow of fluid to said analyzing receiver until a said fluid to be determined has passed through said duct for a predetermined period of time, and pressure-actuated means for ensuring pressure in said duct for said predetermined period of time. And means responsive to said passage of fluid for said predetermined period of time for introducing a predetermined quantity of said fluid to be determined from said duct into said analyzing receiver.

2. Apparatus according to claim 1, wherein the analyzing receiver comprises a photometer constituted by a measuring bridge comprising two photoelectric cells connected to an ammeter and between which is disposed a source of light illuminating the cells respectively through a reference ampulla and through a test ampulla containing a reagent, and means for setting the photometer at zero comprising a screw acting on a lever which displaces the light source.

3. Apparatus according to claim 2, and means to prevent the photometric measurement from being made before any reaction is finished.

4. Apparatus according to claim 1, wherein the said duct is provided at one end with a two-way valve one way of which serves as inlet for the filling and as outlet for the flushing and the other one of which is connected to the said analyzing receiver, and the other end is connected to a second two-way valve one way of which is connected to a flushing and evacuating pump and the other one of and is connected to an exhaust valve.

5. Apparatus according to claim 4, wherein the valves are electromagnetic valves and the cycle is controlled by a set of cams actuated by an electric motor, the starting of which is ensured, during the filling operation, by a switch actuated by said exhaust valve.

6. Apparatus according to claim 4, wherein the duct is coil shaped and formed in a metallic block the temperature of which is maintained constant.